UNITED STATES PATENT OFFICE.

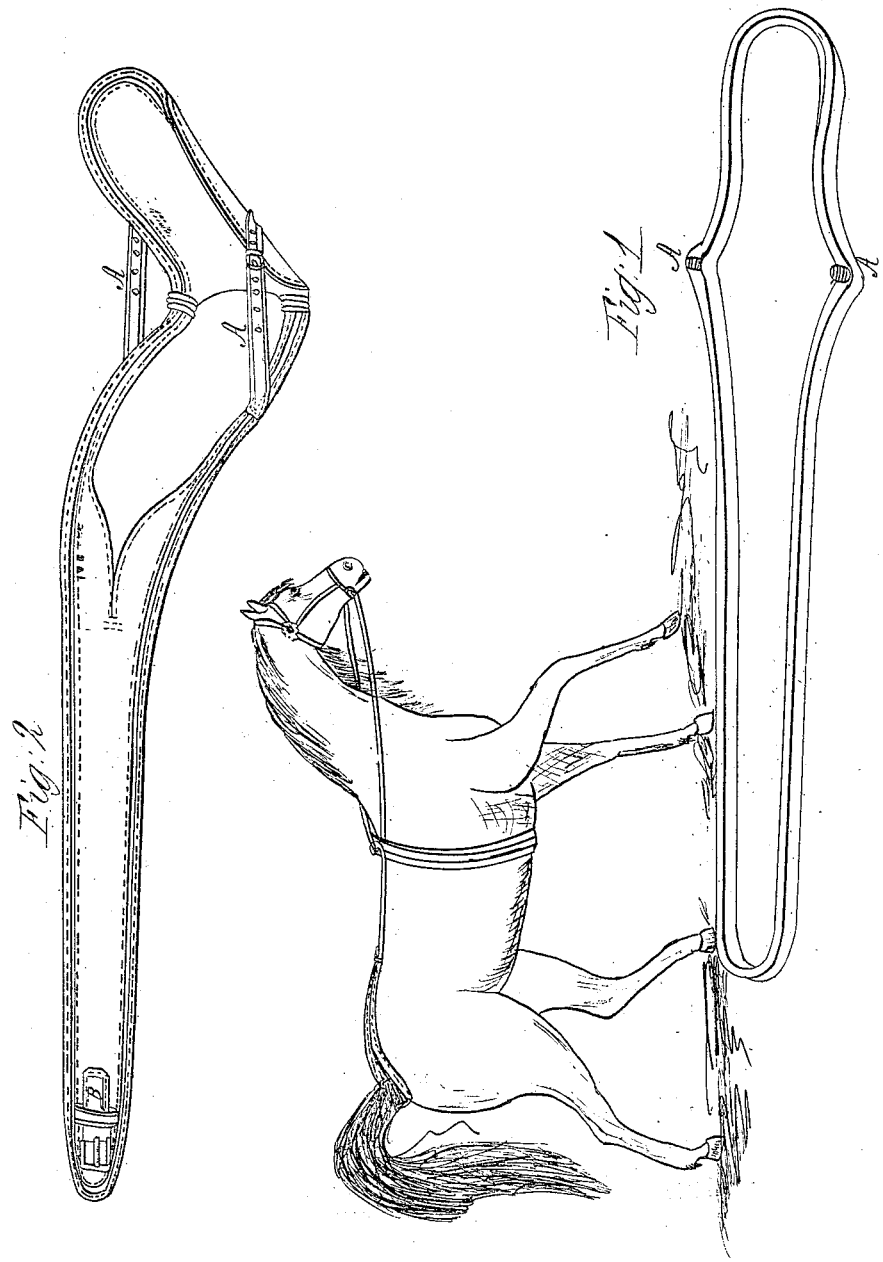

JOHN J. FLACK, OF JOLIET, ILLINOIS.

CRUPPER FOR HARNESS.

Specification of Letters Patent No. 9,133, dated July 20, 1852.

*To all whom it may concern:*

Be it known that I, JOHN J. FLACK, of the town of Joliet, county of Will, and State of Illinois, have invented a new and useful Improvement on a Crupper, to be attached to bitting bridles for taming and subduing horses or to be attached to saddles or to harness or other gearing for horses; and I do hereby declare that the following is a full, clear, and exact description of the construction and operation of the same, reference being had to the annexed drawings, making a part of this specification, in which—

Figure 1 represents an iron wire frame A, A, joints in the frame. Fig. 2 the frame covered with leather, or crupper complete.

A A are straps and buckles, or india rubber or metallic springs, which raise or lower and hold in position the short end of the crupper from the joints, or that part of the crupper passing under the tail of the horse. B, buckle by which the crupper is attached to the bitting bridle, saddle, harness, or other gearing. The crupper is made of iron or other metallic wire, or rods, consisting of two, lying parallel of such length and shape as will fit the back and rump of the horse, with joints in the rods near one end, where the rods fit to the horse on each side of the tail, so that the short end of the frame from the joints may be raised or let down, the rods or frame is covered with leather, and sewed to a leather strap of such width as may be desired, a hole is made in the strap at the joints in the rods or frame for the tail of the horse to pass through; the tail of the horse then rests on the strap and covering of the short end of the frame from the joints and can be raised or lowered at pleasure, and kept in such a position as may be desired, by means of two straps, or india rubber or metallic springs, attached to the short end of the crupper, or that part under the tail of the horse, one on each side of the tail, and fastened by means of buckles or otherwise to that part of the crupper resting on the rump of the horse, the crupper is fastened by means of straps or buckles to the bitting bridle, saddle, harness or other gearing.

What I claim as my invention, and desire to secure by Letters Patent, is—

The construction of a crupper as herein described, by means of which in taming or subduing horses, the tail of the horse may be kept in a desired position without the necessity of resorting to the painful and injurious operation of nicking, or pricking, and the pulleys, and to be used for the same purpose, when riding or driving the horse.

JOHN J. FLACK.

Witnesses:
RICHARD DOOLITTLE,
A. F. PATRICK.